US010767496B2

(12) United States Patent
Freeman et al.

(10) Patent No.: US 10,767,496 B2
(45) Date of Patent: Sep. 8, 2020

(54) TURBINE BLADE ASSEMBLY WITH MOUNTED PLATFORM

(71) Applicants: Rolls-Royce North American Technologies Inc., Indianapolis, IN (US); Rolls-Royce Corporation, Indianapolis, IN (US)

(72) Inventors: Ted J. Freeman, Danville, IN (US); Michael A. Kowalkowski, Indianapolis, IN (US)

(73) Assignees: Rolls-Royce North American Technologies Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 250 days.

(21) Appl. No.: 15/934,350

(22) Filed: Mar. 23, 2018

(65) Prior Publication Data

US 2019/0292922 A1 Sep. 26, 2019

(51) Int. Cl.
*F01D 5/30* (2006.01)
*F01D 5/28* (2006.01)

(52) U.S. Cl.
CPC ............ *F01D 5/282* (2013.01); *F01D 5/284* (2013.01); *F01D 5/3007* (2013.01); *F05D 2230/21* (2013.01); *F05D 2230/237* (2013.01); *F05D 2240/80* (2013.01); *F05D 2300/6033* (2013.01)

(58) Field of Classification Search
CPC ........ F01D 5/282; F01D 5/3007; F01D 5/284; F01D 5/147; F01D 11/008; F01D 5/3084; F05D 2300/6033; F05D 2230/21; F05D 2230/237; F05D 2240/80; F05D 2260/36
See application file for complete search history.

(56) References Cited

U.S. PATENT DOCUMENTS

| | | | | |
|---|---|---|---|---|
| 5,318,406 A | * | 6/1994 | Bardes | B23P 15/04 29/889.21 |
| 7,762,781 B1 | * | 7/2010 | Brown | F01D 5/147 416/193 A |
| 8,257,038 B2 | * | 9/2012 | James | B22F 5/009 415/215.1 |
| 8,435,007 B2 | * | 5/2013 | Morrison | F23M 5/04 416/193 A |
| 8,914,976 B2 | | 12/2014 | Campbell et al. | |
| 9,017,033 B2 | | 4/2015 | Brown et al. | |
| 9,156,086 B2 | | 10/2015 | James | |
| 9,212,560 B2 | | 12/2015 | McCaffrey | |
| 9,228,445 B2 | | 1/2016 | Darkins, Jr. et al. | |
| 9,803,486 B2 | | 10/2017 | Freeman et al. | |
| 2007/0189901 A1 | * | 8/2007 | Dundas | F01D 5/3007 416/223 A |
| 2011/0142639 A1 | * | 6/2011 | Campbell | F01D 5/081 416/95 |
| 2011/0142684 A1 | * | 6/2011 | Campbell | B23P 15/04 416/248 |

(Continued)

*Primary Examiner* — Aaron R Eastman
(74) *Attorney, Agent, or Firm* — Barnes & Thornburg LLP

(57) ABSTRACT

A turbine blade assembly adapted for use in a gas turbine engine is disclosed in this paper. A primary member of the turbine blade assembly shaped to form an airfoil and comprises ceramic matrix composite materials. A independent platform of the turbine blade assembly is coupled to the primary member of the turbine blade assembly such that the primary member need not be shaped to provide the platform.

19 Claims, 6 Drawing Sheets

(56) References Cited

U.S. PATENT DOCUMENTS

| | | | | |
|---|---|---|---|---|
| 2011/0243746 | A1* | 10/2011 | Liotta | F01D 5/282 |
| | | | | 416/214 R |
| 2013/0064668 | A1* | 3/2013 | Paige, II | F01D 5/284 |
| | | | | 416/219 R |
| 2016/0040539 | A1* | 2/2016 | McCaffrey | F01D 5/147 |
| | | | | 60/805 |
| 2016/0177749 | A1* | 6/2016 | Brandl | F01D 5/225 |
| | | | | 416/219 R |
| 2016/0201483 | A1* | 7/2016 | Engel | F01D 5/282 |
| | | | | 416/220 R |
| 2016/0290146 | A1 | 10/2016 | Brandl | |
| 2017/0175534 | A1* | 6/2017 | Ferber | F01D 5/288 |
| 2018/0030840 | A1 | 2/2018 | Freeman et al. | |
| 2019/0323371 | A1* | 10/2019 | Harris | F01D 11/008 |
| 2019/0323372 | A1* | 10/2019 | Freeman | F01D 5/3007 |

* cited by examiner

TURBINE BLADE ASSEMBLY WITH MOUNTED PLATFORM

FIELD OF THE DISCLOSURE

The present disclosure relates generally to turbine blade assemblies for gas turbine engines, and more specifically to turbine blade assemblies that comprise ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include blades that have ceramic matrix composite material components. Ceramic matrix composite materials are able to withstand very high temperatures, often without active cooling. Manufacture of turbine blades to include ceramic matrix composite materials can present challenges when detailed features of the turbine blades are considered because of material properties and available manufacturing methods that must be taken into account. Accordingly, work on the design of turbine blades including ceramic matrix composites is ongoing.

SUMMARY

The present disclosure may comprise one or more of the following features and combinations thereof.

According to the present disclosure, a turbine blade assembly may be configured to be rotated about an axis to withdraw mechanical energy from gasses interacting with the turbine blade assembly. Such a turbine blade assembly may include a primary member (sometimes called the turbine blade) made from ceramic matrix composite materials and an independent platform. The primary member may be shaped to form both an airfoil and an attachment post. The independent platform may be formed to include an aperture that receives the attachment post and engages a substantially radially-inwardly facing surface of the airfoil to block radially-outward motion of the independent platform relative to the primary member.

In illustrative embodiments, the turbine blade assembly may further include a clip that interfaces with the primary member and the independent platform. The clip may fix the independent platform to the primary member and block radially-inward motion of the independent platform relative to the primary member.

In illustrative embodiments, the turbine blade assembly may further include retainer blocks. The retainer blocks may engage a radially-inwardly facing surface of the independent platform to block radially-inward motion of the independent platform relative to the primary member of the turbine blade assembly. The retainer blocks may be coupled to the attachment post of the primary member.

In illustrative embodiments, the retainer blocks may be shaped to provide a root of the turbine blade assembly configured to engage with a slot formed in a corresponding turbine disk. The retainer blocks may be formed to include recesses, each of the recesses positioned to receive a portion of the attachment post of the primary member. The recesses formed in the retainer blocks may be shaped so as to block removal of the attachment post from the root provided by the retainer blocks.

In illustrative embodiments, the retainer blocks may be fixed to one another. In some embodiments, the retainer blocks are fixed to one another by a diffusion braze or diffusion bond.

In illustrative embodiments, the clip may be a bi-cast component that interfaces with the attachment post of the primary member included in the turbine blade assembly. In some embodiments, the clip may be a bi-cast component and interfaces with the airfoil of the primary member included in the turbine blade assembly.

In illustrative embodiments, the attachment post of the primary member may be shaped to provide a root of the turbine blade assembly. The root of the turbine blade assembly is configured to engage with a slot formed in a corresponding turbine disk.

According to another aspect of the present disclosure, a turbine blade assembly may include a primary member (sometimes called the turbine blade) made from ceramic matrix composite materials, an independent platform, and retainer blocks. The primary member may be shaped to form an airfoil and an attachment post. The independent platform may be formed to include an aperture that receives the attachment post and engages a radially-inwardly facing surface of the airfoil to block radially-outward motion of the independent platform relative to the primary member. The retainer blocks may be configured to block radially-inward motion of the independent platform relative to the primary member.

In illustrative embodiments, the retainer blocks may engage a radially-inwardly facing surface of the independent platform to block radially-inward motion of the independent platform relative to the primary member. Accordingly, the independent platform is retained in place relative to the primary member. In some embodiments, the retainer blocks are coupled to the attachment post of the primary member.

In illustrative embodiments, the independent platform may be coupled to the attachment post by a clip to fix the independent platform in place relative to the primary member of the turbine blade assembly. The clip may be a bi-cast component.

In illustrative embodiments, the retainer blocks may be shaped to provide a root of the turbine blade assembly configured to engage with a slot formed in a corresponding turbine disk. The retainer blocks may be formed to include recesses, each of the recesses positioned to receive a portion of the attachment post of the primary member. The retainer blocks may be fixed to one another and the recesses formed in the retainer blocks are shaped so as to block removal of the attachment post from the root provided by the retainer blocks. The retainer blocks may be fixed to one another by a diffusion braze or diffusion bond.

In illustrative embodiments, the retainer blocks may extend around only a portion of the attachment post adjacent to the independent platform to form a keeper collar. The attachment post may be shaped to provide a root of the turbine blade assembly configured to engage with a slot formed in a corresponding turbine disk. The attachment post may have a dovetail shape configured to engage with a dovetail slot formed in a corresponding turbine disk. The retainer blocks of the keeper collar may be fixed to the attachment post by at least one bi-cast clip.

According to another aspect of the present disclosure, a turbine blade assembly may include a primary member (sometimes called the turbine blade) made from ceramic matrix composite materials, an independent platform, and a braze layer or braze joint. The primary member may be shaped to form an airfoil and an attachment post. The independent platform may be formed to include an aperture that receives the attachment post and engages a radially-inwardly facing surface of the airfoil to block radially-outward motion of the independent platform relative to the primary member. The braze layer or joint may be configured to resist radially-inward motion of the independent platform relative to the primary member.

In illustrative embodiments, the braze layer or joint may interfaces with the primary member and the independent platform. Accordingly, the braze layer or joint can fix the independent platform to the primary member and block radially-inward motion of the independent platform relative to the primary member.

These and other features of the present disclosure will become more apparent from the following description of the illustrative embodiments.

DETAILED DESCRIPTION OF THE DRAWINGS

Figure 1:
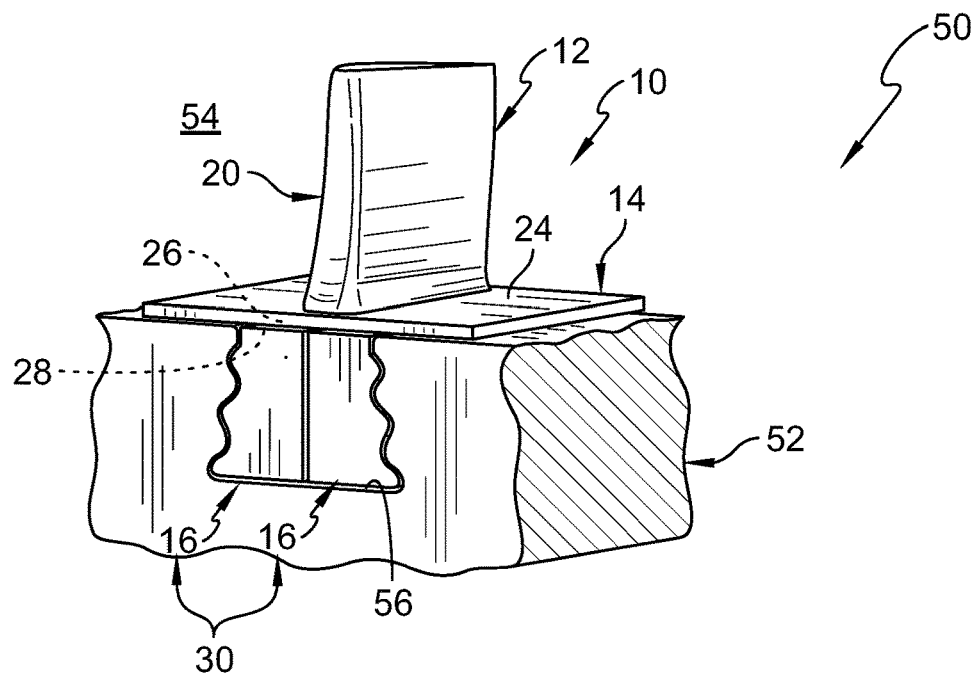
FIG. 1 is a partial perspective view of a turbine wheel adapted for use in a gas turbine engine showing that the turbine wheel includes a disk and a turbine blade assembly coupled to the disk by a fir-tree type root.

For the purposes of promoting an understanding of the principles of the disclosure, reference will now be made to a number of illustrative embodiments illustrated in the drawings and specific language will be used to describe the same.

Turbine blade assemblies 10, 210, 310, 410 of the present disclosure each include primary members 12, 212, 312, 412, sometimes called turbine blades, and platforms 14, 214, 314, 414. The primary members 12, 212, 312, 412 are made from ceramic matrix composite materials designed to withstand very high temperatures. The platforms 14, 214, 314, 414 are originally made independent of the turbine blade assemblies 10, 210, 310, 410 so as to avoid excessively complex, integrated composite material manufacturing processes. To couple the platforms 14, 214, 314, 414 to the corresponding primary members 12, 212, 312, 412, various means for mounting are described in the following specific embodiments. Among the described means for mounting, clips 40, 240, 340 and braze joints 440 are provided along with other features to locate the platforms 14, 214, 314, 414 relative to the primary members 12, 212, 312, 412.

Figure 2:
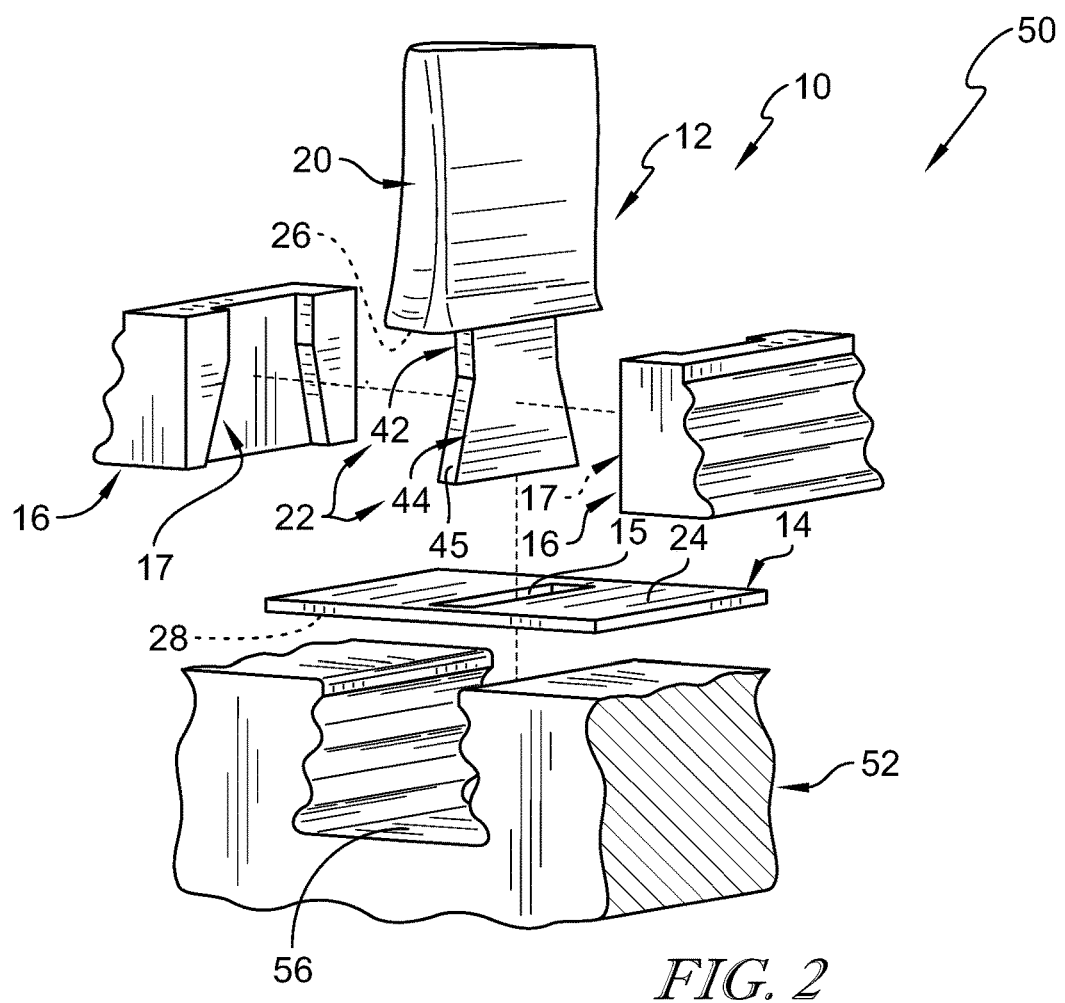
FIG. 2 is an exploded assembly view of the turbine wheel of FIG. 1 showing that the turbine blade assembly includes a primary member (sometimes called a turbine blade) shaped to form an airfoil and an attachment post, an independent platform having an aperture sized to receive the attachment post, and retainer blocks that engage the attachment post inward of the platform to provide means for coupling the platform to the primary member.
Figure 3:
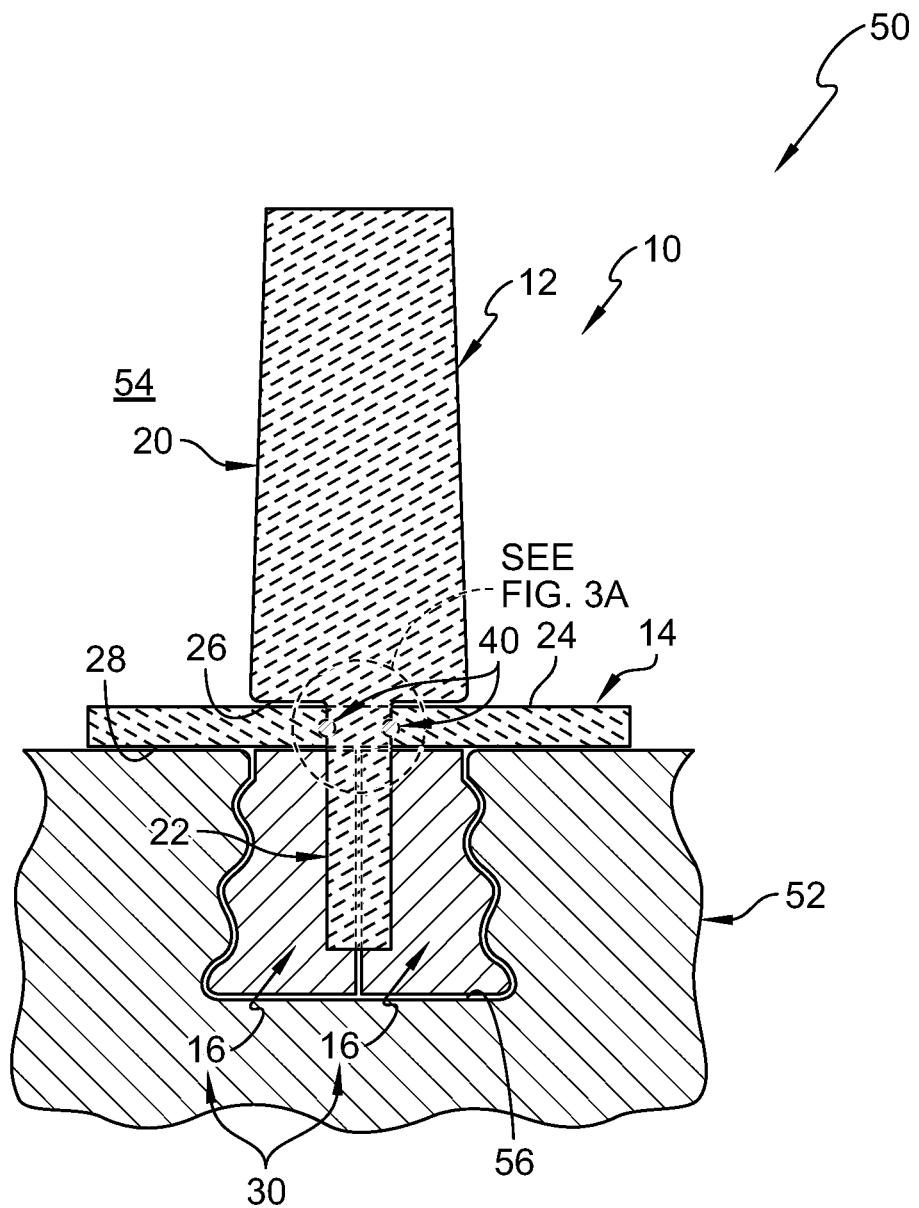
FIG. 3 is a representative cross-sectional view of the turbine wheel of FIGS. 1 and 2 showing that in the illustrated design the primary member of the turbine blade assembly comprises ceramic matrix composite materials and further showing that the independent platform comprises ceramic matrix composite materials while the retainer blocks and the disk comprise metallic materials.

Turning to FIGS. 1-3 of the present application, an illustrative turbine wheel 50 adapted for use in a gas turbine engine is shown. The turbine wheel includes a rotor disk 52 (only a portion of which is shown) and a plurality of turbine blade assemblies 10 (only one of which is shown). In accordance with the present disclosure, the turbine blade assemblies 10 are attached to the rotor disk 52 for rotation with the turbine disk 52 about a central axis of the associated gas turbine engine. The turbine blade assemblies 10 include ceramic matrix composite components capable of withstanding relatively high temperatures that may be created within the associated gas turbine engine.

The turbine blade assembly 10 is assembled with a platform 14 that is independent of an airfoil 20 made from ceramic matrix composite materials such that the component forming the airfoil 20 need not be shaped to provide the platform 14 as shown in FIG. 2. More specifically, the turbine blade assembly 10 includes a primary member 12 shaped to form the airfoil 20 and an attachment post 22, a platform 14 mounted to the primary member 12 at the interface of the airfoil with the attachment post 22, and retainer blocks 16 that are coupled to the attachment post 22 to hold the platform 14 in place.

The primary member 12 of the turbine blade assembly 10 is made from ceramic matrix composite materials designed for high temperature environments. As noted above, the primary member 12, sometimes called a turbine blade, is shaped to include an airfoil 20 and an attachment post 22 as shown in FIGS. 2 and 3. The airfoil 20 is shaped to interact with hot, high pressure gasses moving through a primary flow path 54 of an associated gas turbine engine. The attachment post 22 extends inward in a radial direction toward the central axis from the airfoil 20 to support coupling of the primary member 12 to the turbine disk 52. The attachment post 22 illustratively includes a stem 42 and a head 44 that provides surfaces 45 that are engaged by the retainer blocks 16 to block radially-outward motion of the primary member 12 relative to the retainer blocks 16 when the turbine blade assembly 10 is put together.

The platform 14 of the turbine blade assembly 10 is illustratively made from ceramic matrix composite materials designed for high temperature environments such as the environment of the primary flow path 54. However, in some embodiments, the platform 14 may be made from monolithic ceramic materials or metallic materials. The platform 14 extends circumferentially and axially from the airfoil 20 to define a radially-inward side of the primary flow path 54.

The platform 14 is illustratively formed to include an aperture 15 that receives the attachment post 22 of the primary member 12 as shown in FIGS. 2 and 3. The attachment post 22 is sized to slide through the aperture 15 until a radially outwardly facing surface 24 the platform 14 engages a radially-inwardly facing surface 26 of the airfoil 20 to block radially-outward motion of the platform 14 relative to the primary member 12. The platform 14 is an independent component in that it is not co-infiltrated or integral with the primary member 12 of the turbine blade assembly 10. Rather, the platform 14 is mounted to the primary member 12 via other coupling means.

The retainer blocks 16 of the turbine blade assembly 10 provide means for mounting the platform 14 to the primary member 12 as shown in FIGS. 1-3. The retainer blocks 16 couple to the attachment post 22 of the primary member 12 and are arranged to engage a radially-inwardly facing surface 28 of the platform 14 to block radially-inward motion of the platform 14 relative to the primary member 12. Accordingly, the platform 14 is trapped between the airfoil 20 of the primary member 12 and the retainer blocks 16 so as to be retained in place relative to the primary member 12.

The retainer blocks 16 are illustratively shaped to provide a root 30 of the turbine blade assembly 10 and are configured to engage with a slot 56 formed in the turbine disk 52 as shown in FIGS. 1-3. The retainer blocks 16 shown have an external fir-tree shape to correspond to the shape of the slot 56 of the turbine disk 52; however, a dovetail or other suitable shape may also be used. The retainer blocks 16 are each formed to include a recesses 17 that receive a portion of the attachment post 22 included in the primary member 12.

The recesses 17 formed in the retainer blocks are shaped so as to block removal of the attachment post 22 from the root 30 provided by the retainer blocks 16 when the turbine blade assembly 10 is put together as suggested in FIGS. 1-3. The retainer blocks 16 may optionally be fixed to one another by a diffusion weld, diffusion braze, diffusion bond, bi-cast joint, or the like when the turbine blade assembly 10 is put together.

Figure 3A:
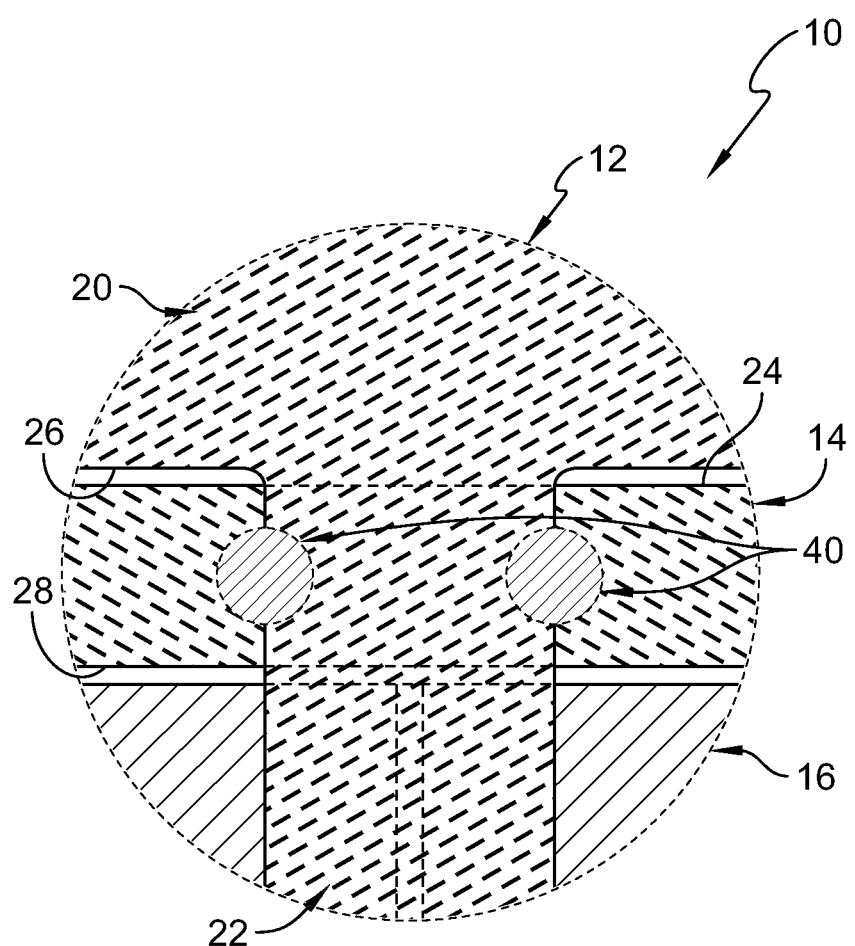
FIG. 3A is a detail view of a portion of FIG. 3 showing that an optional clip can be inserted between the primary member and the platform to provide further/alternative means for fixing the platform to the primary member.

An optional clip 40 may also be included in the turbine blade assembly 10 to provide additional/alternative means for mounting the platform 14 to the primary member 12 as shown in FIGS. 3 and 3A. The clip 40 interfaces with the attachment post 22 of the primary member 12 and the platform 14 around the aperture 15 to fix the platform 14 to the primary member 12.

In the illustrative embodiment, the clip 40 is a bi-cast metal clip formed in a passage defined by grooves in the attachment post 22 of the primary member 12 and in the retainer blocks 16 such that a chemical bond between the clip 40 and its adjacent components is formed. In some embodiments, the clip 40 may be a simple metallic clip or pin inserted into the passage. In still other embodiments, the clip 40 may be a preform clip made up of multiple pieces assembled into the passage that are later sintered together in the passage so as to form a single component that does not chemically bond with the surrounding components.

Figure 4:
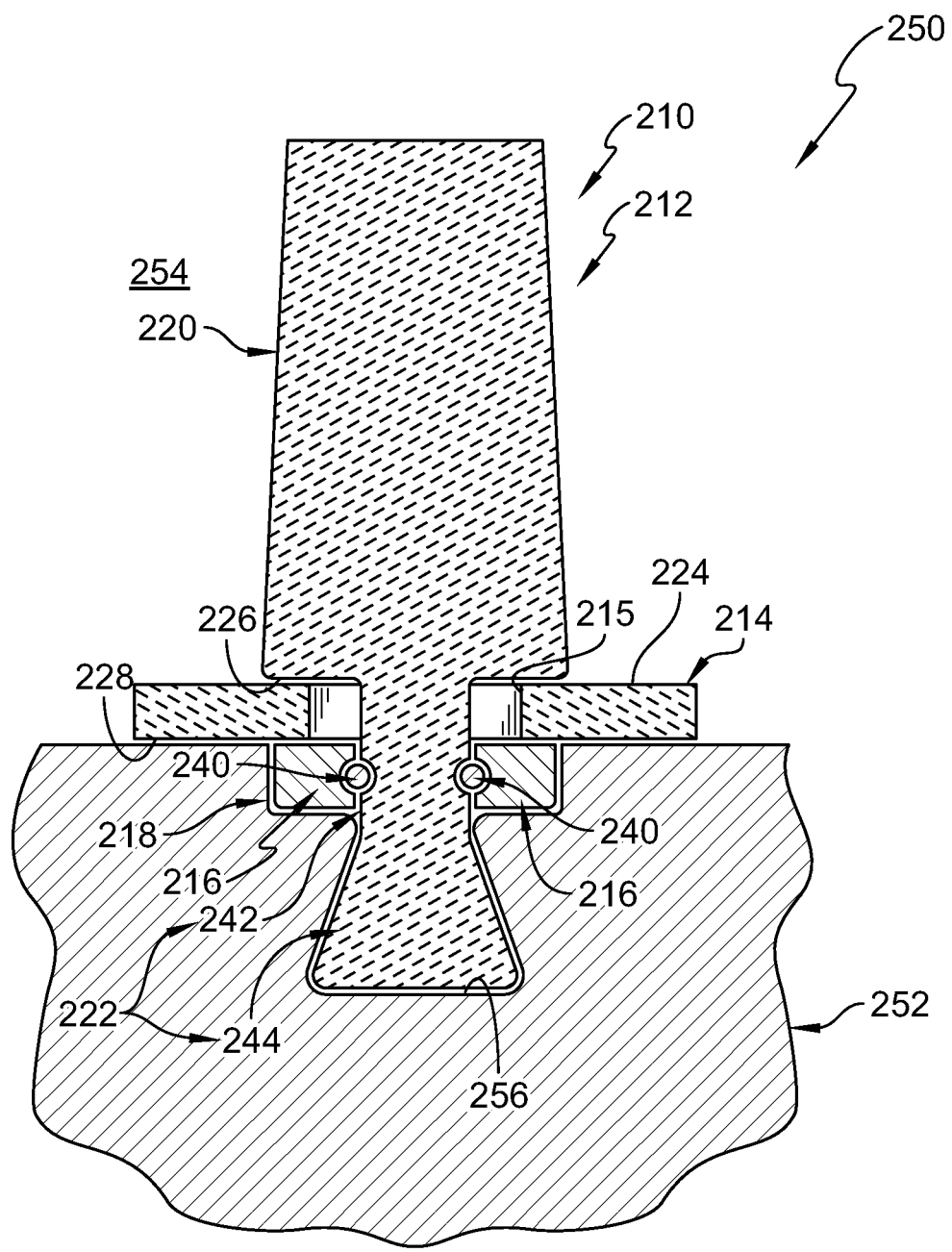
FIG. 4 is a representative cross-sectional view of second turbine wheel including a disk and a turbine blade assembly showing that the turbine blade assembly includes a primary member that forms an airfoil and an attachment post, an independent platform formed to include an aperture sized to receive the attachment post, and a keeper collar made up of retainer blocks that are bi-cast to the attachment post radially inward of the independent platform to block removal of the independent platform.

Looking to FIG. 4, a second turbine wheel 250 adapted for use in a gas turbine engine is shown. The turbine wheel includes a rotor disk 252 (only a portion of which is shown) and a plurality of turbine blade assemblies 210 (only one of which is shown). In accordance with the present disclosure, the turbine blade assemblies 210 are attached to the rotor disk 252 for rotation with the rotor disk 252 about a central axis of the associated gas turbine engine. The turbine blade assemblies 210 include ceramic matrix composite components capable of withstanding relatively high temperatures that may be created within the associated gas turbine engine.

The turbine blade assembly 210 is assembled with a platform 214 that is independent of an airfoil 220 made from ceramic matrix composite materials such that the component forming the airfoil 220 need not be shaped to provide the platform 214 as shown in FIG. 4. More specifically, the turbine blade assembly 210 includes a primary member 212 shaped to form the airfoil 220 and an attachment post 222, a platform 214 mounted to the primary member 212 at the interface of the airfoil 220 with the attachment post 222, and retainer blocks 216 that cooperate to form a keeper collar 218 configured to hold the platform 214 in place.

The primary member 212 of the turbine blade assembly 210 is made from ceramic matrix composite materials designed for high temperature environments. As noted above, the primary member 212, sometimes called a turbine blade, is shaped to include an airfoil 220 and an attachment post 222 as shown in FIG. 4. The airfoil 220 is shaped to interact with hot, high pressure gasses moving through a primary flow path 254 of an associated gas turbine engine. The attachment post 222 extends inward in a radial direction toward the central axis from the airfoil 220 to support coupling of the primary member 212 to the turbine disk 252.

The attachment post 222 of the primary member 212 illustratively includes a stem 242 and a head 244 as shown in FIG. 4. The platform 214 and the keeper collar 218 are mounted along the stem 242 adjacent to the airfoil 220. The head 244 extends radially inward from the stem 242 and provides a root 230 of the turbine blade assembly 210. The root 230 of the turbine blade assembly 210 is configured to engage with a slot 256 formed in the turbine disk 252 as shown in FIG. 4. The head 244 shown has an external dovetail shape to correspond to the shape of the slot 256 of the turbine disk 252; however, a fir-tree shape or other suitable shape may also be used.

The platform 214 of the turbine blade assembly 210 is illustratively made from ceramic matrix composite materials designed for high temperature environments such as the environment of the primary flow path 254. However, in some embodiments, the platform 214 may be made from monolithic ceramic materials or metallic materials. The platform 214 extends circumferentially and axially from the airfoil 20 to define a radially-inward side of the primary flow path 54.

The platform 214 is illustratively formed to include an aperture 215 that receives the attachment post 222 of the primary member 212 as shown in FIG. 4. The attachment post 222 is sized to slide through the aperture 215 until a radially outwardly facing surface 224 the platform 214 engages a radially-inwardly facing surface 226 of the airfoil 220 to block radially-outward motion of the platform 214 relative to the primary member 212. The platform 214 is an independent component in that it is not co-infiltrated or integral with the primary member 212 of the turbine blade assembly 210. Rather, the platform 214 is mounted to the primary member 212 via other coupling means.

The keeper collar 218 made up of retainer blocks 216 provides means for mounting the platform 214 to the primary member 212 as shown in FIG. 4. The keeper collar 218 is coupled to stem 242 of the attachment post 222 included in the primary member 12 and is arranged to engage a radially-inwardly facing surface 228 of the platform 214 to block radially-inward motion of the platform 214 relative to the primary member 212. Accordingly, the platform 214 is trapped between the airfoil 220 of the primary member 212 and the keeper collar 218 so as to be retained in place relative to the primary member 212.

The keeper collar 218 is illustratively made up of two C-shaped retainer blocks 216 coupled to the stem 242 of the attachment post 222 included in the primary member 212 of the turbine blade assembly 210 as suggested in FIG. 4. The retainer blocks 216 of the keeper collar 218 are coupled to the stem 242 by clips 240. In some embodiments, the retainer blocks 216 are coupled/fixed to one another by diffusion weld, diffusion braze, diffusion bond, bi-cast joint, or other means to trap the stem 242 therebetween and couple the keeper collar 218 to the stem 242 of the attachment post 222.

In other embodiments, the keeper collar 218 may be made up of more or fewer retainer blocks 216 mounted to engage a radially-inwardly facing surface 228 of the platform 214 to block radially-inward motion of the platform 214. For example, a single U-shaped retainer block 216 may make up the keeper collar 218. In any case, upon assembly, the platform 214 is mounted to the primary member 212 via sandwiching of the platform 214 radially between the airfoil 220 and the keeper collar 218 to fix the platform 214 relative to the primary member 212.

In the illustrative embodiment, the clips 240 are bi-cast metal clips formed in a passages defined by grooves in the attachment post 222 of the primary member 212 and in the retainer blocks 216 of the keeper collar 218 such that a chemical bond between the clips 240 and adjacent components is formed. In some embodiments, the clips 240 may be a simple metallic clip or pin inserted into the passage. In still other embodiments, the clips 240 may be a preform clip made up of multiple pieces assembled into the passage that are later sintered together in the passage so as to form a single component that does not chemically bond with the surrounding components.

Figure 5:
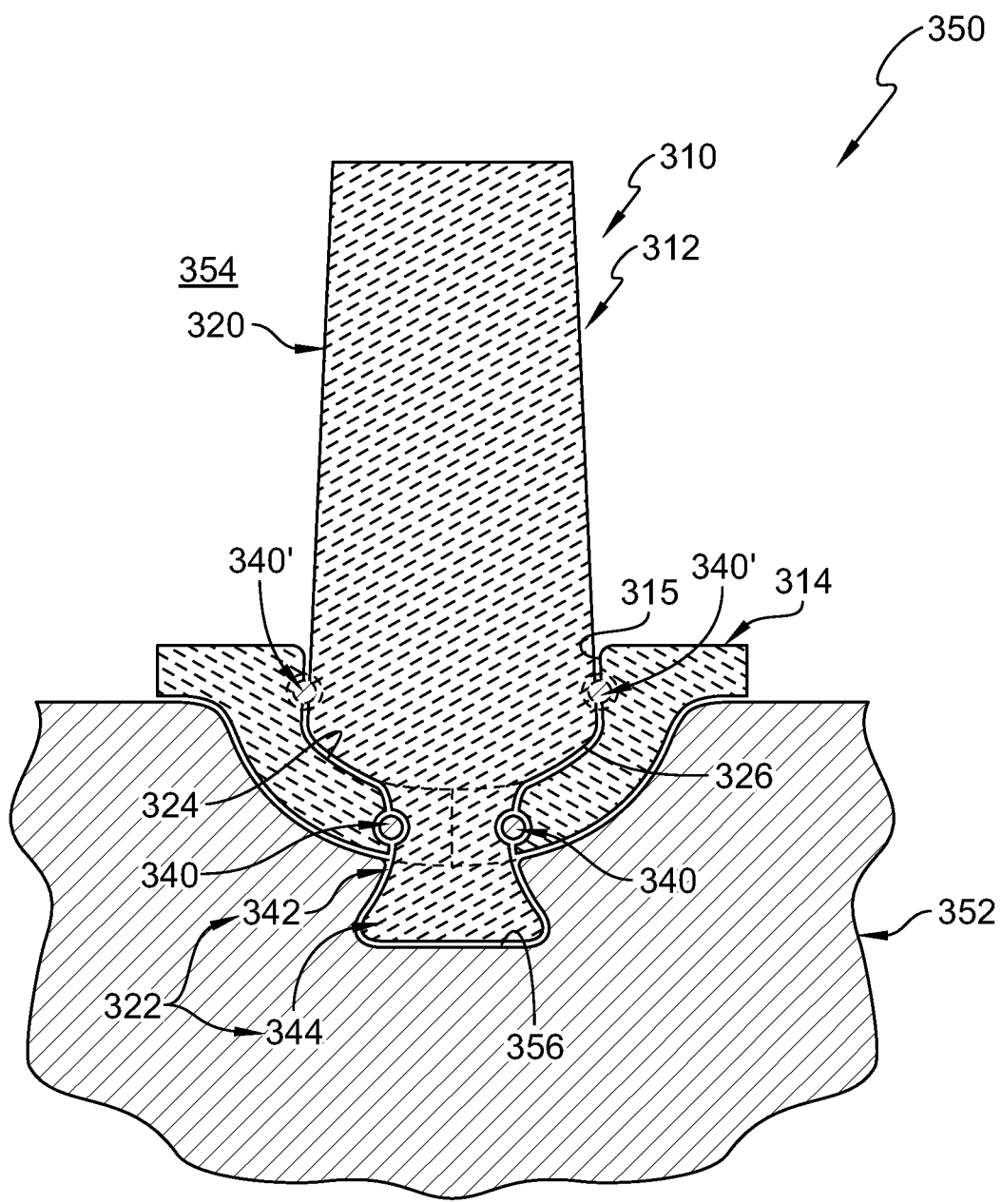
FIG. 5 is a representative cross-sectional view of third turbine wheel including a disk and a turbine blade assembly showing that the turbine blade assembly includes a primary member that forms an airfoil and an attachment post and an independent platform formed to include an aperture sized to receive the attachment post, and further showing that the independent platform is bi-cast to the attachment post to block removal of the independent platform.

Now turning to FIG. 5 of the present application, a third turbine wheel 350 adapted for use in a gas turbine engine is shown. The turbine wheel includes a rotor disk 352 (only a portion of which is shown) and a plurality of turbine blade assemblies 310 (only one of which is shown). In accordance with the present disclosure, the turbine blade assemblies 310 are attached to the rotor disk 352 for rotation with the rotor disk 352 about a central axis of the associated gas turbine engine. The turbine blade assemblies 310 include ceramic matrix composite components capable of withstanding relatively high temperatures that may be created within the associated gas turbine engine.

The turbine blade assembly 310 is assembled with a platform 314 that is independent of an airfoil 320 made from ceramic matrix composite materials such that the component forming the airfoil 320 need not be shaped to provide the platform 314 as shown in FIG. 5. More specifically, the turbine blade assembly 310 includes a primary member 312 shaped to form the airfoil 320 and an attachment post 322, a platform 314 mounted to the primary member 312 at the interface of the airfoil with the attachment post 322, and a clip 340 that formed between the primary member 312 and the platform 314 to hold the platform 314 in place.

The primary member 312 of the turbine blade assembly 310 is made from ceramic matrix composite materials designed for high temperature environments. As noted above, the primary member 312, sometimes called a turbine blade, is shaped to include an airfoil 320 and an attachment post 322 as shown in FIG. 5. The airfoil 320 is shaped to interact with hot, high pressure gasses moving through a primary flow path 354 of an associated gas turbine engine. The attachment post 322 extends inward in a radial direction toward the central axis from the airfoil 320 to support coupling of the primary member 312 to the turbine disk 352.

The attachment post 322 of the primary member 312 illustratively includes a stem 342 and a head 344 as shown in FIG. 5. The platform 314 is mounted along the stem 342 adjacent to the airfoil 320. The head 344 extends radially inward from the stem 342 and provides a root 330 of the turbine blade assembly 310. The root 330 of the turbine blade assembly 310 is configured to engage with a slot 356 formed in the turbine disk 352 as shown in FIG. 5. The head 344 shown has an external dovetail shape to correspond to the shape of the slot 356 of the turbine disk 352; however, a fir-tree shape or other suitable shape may also be used.

The platform 314 of the turbine blade assembly 310 is illustratively made from ceramic matrix composite materials designed for high temperature environments such as the environment of the primary flow path 354. However, in some embodiments, the platform 314 may be made from monolithic ceramic materials or metallic materials. The platform 314 extends circumferentially and axially from the airfoil 320 to define a radially-inward side of the primary flow path 354.

The platform 314 is illustratively formed to include an aperture 315 that receives the attachment post 322 of the primary member 312 as shown in FIG. 5. The attachment post 322 is sized to slide through the aperture 315 until a radially outwardly facing surface 324 the platform 314 engages a radially-inwardly facing surface 326 of the airfoil 320 to block radially-outward motion of the platform 314 relative to the primary member 312. The platform 314 is an independent component in that it is not co-infiltrated or integral with the primary member 312 of the turbine blade assembly 310. Rather, the platform 314 is mounted to the primary member 312 via other coupling means.

In the turbine blade assembly 310, the clip 340 provides means for mounting the platform 314 to the primary member 312 as shown in FIG. 5. The clip 340 interfaces with stem 342 of the attachment post 322 included in the primary member 312 and the platform 314 around the aperture 315 to fix the platform 314 to the primary member 312.

In some embodiments, an alternative/additional clip 340' may provide further means for mounting the platform 314 to the primary member 312 as shown in FIG. 5. The clip 340' interfaces with a radially-inward portion of the airfoil 320 included in the primary member 312 and the platform 314 around the aperture 315 to fix the platform 314 to the primary member 312.

In the illustrative embodiment, the clips 340/340' are bi-cast metal clips formed in a passage defined by grooves in the attachment post 322 of the primary member 312 and in the platform 314 such that a chemical bond between the clip 340/340' and its adjacent components is formed. In some embodiments, the clip 340/340' may be a simple metallic clip or pin inserted into the passage. In still other embodiments, the clips 340/340' may be a preform clip made up of multiple pieces assembled into the passage that are later sintered together in the passage so as to form a single component that does not chemically bond with the surrounding components.

Figure 6:
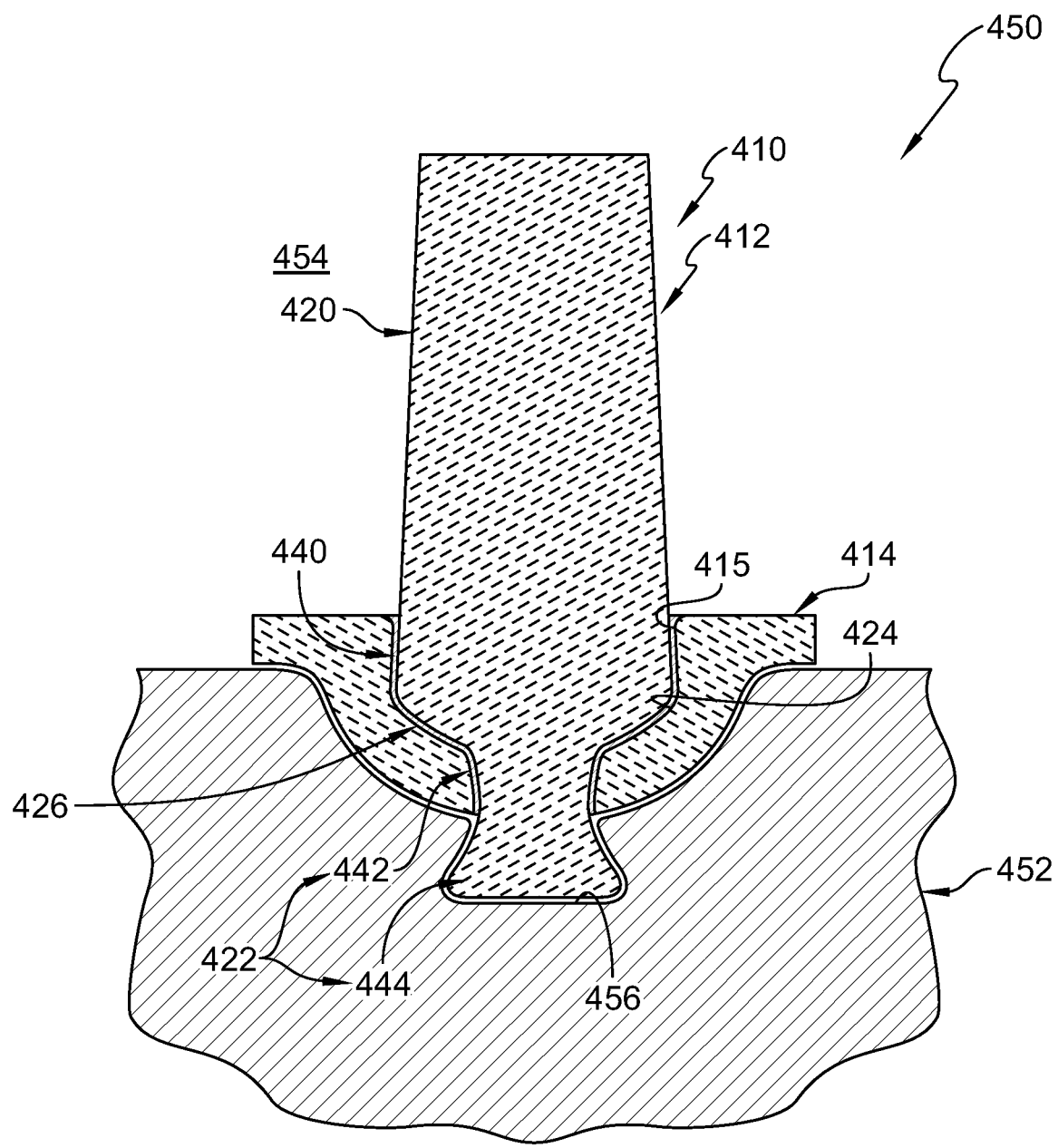
FIG. 6 is a representative cross-sectional view of fourth turbine wheel including a disk and a turbine blade assembly showing that the turbine blade assembly includes a primary member that forms an airfoil and an attachment post and an independent platform formed to include an aperture sized to receive the attachment post, and further showing that the independent platform is brazed to the attachment post to block removal of the independent platform.

Referring to FIG. 6 of the present application, a fourth turbine wheel 450 adapted for use in a gas turbine engine is shown. The turbine wheel includes a rotor disk 452 (only a portion of which is shown) and a plurality of turbine blade assemblies 410 (only one of which is shown). In accordance with the present disclosure, the turbine blade assemblies 410 are attached to the rotor disk 452 for rotation with the rotor disk 452 about a central axis of the associated gas turbine engine. The turbine blade assemblies 410 include ceramic matrix composite components capable of withstanding relatively high temperatures that may be created within the associated gas turbine engine.

The turbine blade assembly 410 is assembled with a platform 414 that is independent of an airfoil 420 made from ceramic matrix composite materials such that the component forming the airfoil 420 need not be shaped to provide the platform 414 as shown in FIG. 6. More specifically, the turbine blade assembly 410 includes a primary member 412 shaped to form the airfoil 420 and an attachment post 422, a platform 414 mounted to the primary member 412 at the interface of the airfoil 420 with the attachment post 422, and a braze layer 440 formed between the primary member 412 and the platform 414 to hold the platform 414 in place.

The primary member 412 of the turbine blade assembly 410 is made from ceramic matrix composite materials designed for high temperature environments. As noted above, the primary member 412, sometimes called a turbine blade, is shaped to include an airfoil 420 and an attachment post 422 as shown in FIG. 6. The airfoil 420 is shaped to interact with hot, high pressure gasses moving through a primary flow path 454 of an associated gas turbine engine. The attachment post 422 extends inward in a radial direction toward the central axis from the airfoil 420 to support coupling of the primary member 412 to the turbine disk 452.

The attachment post 422 of the primary member 412 illustratively includes a stem 442 and a head 444 as shown in FIG. 6. The platform 414 is mounted along the stem 442 adjacent to the airfoil 420. The head 444 extends radially inward from the stem 442 and provides a root 430 of the turbine blade assembly 410. The root 430 of the turbine blade assembly 410 is configured to engage with a slot 456 formed in the turbine disk 452 as shown in FIG. 6. The head 444 shown has an external dovetail shape to correspond to the shape of the slot 456 of the turbine disk 452; however, a fir-tree shape or other suitable shape may also be used.

The platform 414 of the turbine blade assembly 410 is illustratively made from ceramic matrix composite materials designed for high temperature environments such as the environment of the primary flow path 454. However, in some embodiments, the platform 414 may be made from monolithic ceramic materials or metallic materials. The platform 414 extends circumferentially and axially from the airfoil 420 to define a radially-inward side of the primary flow path 454.

The platform 414 is illustratively formed to include an aperture 415 that receives the attachment post 422 of the primary member 412 as shown in FIG. 6. The attachment post 422 is sized to slide through the aperture 415 until a radially outwardly facing surface 424 the platform 414 engages a radially-inwardly facing surface 426 of the airfoil 420 to block radially-outward motion of the platform 414 relative to the primary member 412. The platform 414 is an independent component in that it is not co-infiltrated or integral with the primary member 412 of the turbine blade assembly 410. Rather, the platform 414 is mounted to the primary member 412 via other coupling means.

In the turbine blade assembly 410, the braze layer 440 provides means for mounting the platform 414 to the primary member 412 as shown in FIG. 6. The braze layer 440 interfaces with the primary member 412 along the stem 442 and a radially-inward portion of the airfoil 420. The braze layer 440 interfaces with the platform 414 around the aperture 415 to fix the platform 414 to the primary member 412.

Speaking generally, to improve turbine efficiency, combustor outlet temperatures continue to rise to improve cycle efficiency and power density. Incorporation of ceramic matrix composite (CMC) components into the turbine section of gas turbine engines offer the potential of reducing cooling air requirements due to their higher temperature capability and reducing engine weight due to their low density. One component that may be made from ceramic matrix composite materials for use in turbine engines is turbine blades.

Ceramic matrix composite turbine blades with integrated platforms may present challenges when fabrication is considered. Turbine blade assemblies in accordance with the present disclosure can fabricate the airfoil/stalk/attachment (hereafter—primary members) and platform as separate pieces. These two separate pieces can then be joined after being fully processed by various means, including bi-casting the platform to the primary member. The incorporation of the platform onto the stalk is envisioned as a single piece primary member where the attachment/stalk portion is sized such that the attachment could be slid over the aforementioned attachment post/stalk and located by either tooling or a bulge in the primary member relative to the stalk.

In certain embodiments, it is contemplated that a bi-cast clip, like 40/340, would be integral between the platform and the stalk (or stem) portion of the primary member. Some embodiments can include a keeper, like the keeper collar 218 shown in FIG. 4, which is installed below the platform. The platform would be trapped between a bulge in the primary member and the keeper with the keeper being bi-cast to the stalk/stem. In still another embodiment, it is contemplated that the platform is brazed to the stalk of the primary member.

Methods of fabricating the described blade assemblies may provide for two simple components be fabricated and joined together to fabricate a complex shape. In so doing, it may be possible that these ceramic matrix composite turbine blade assemblies could be brought to market quicker a more complicated single piece blade having an integral platform. Additionally, this method of fabrication could make fabricating a blade with a tip shroud easier as the complicated process of including the platform is simplified by attaching it later.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine blade assembly configured to be rotated about an axis to withdraw mechanical energy from gasses interacting with the turbine blade assembly, the turbine blade assembly comprising a primary member comprising ceramic matrix composite materials, the primary member shaped to form an airfoil and an attachment post, an independent platform formed to include an aperture that receives the attachment post and engages a substantially radially-inwardly facing surface of the airfoil to block radially-outward motion of the independent platform relative to the primary member, a clip that interfaces with the primary member and the independent platform to fix the independent platform to the primary member and block radially-inward motion of the independent platform relative to the primary member, and retainer blocks that engage a radially inner-most facing surface of the independent platform to block radially-inward motion of the independent platform relative to the primary member of the turbine blade assembly.

2. The turbine blade assembly of claim 1, wherein the retainer blocks are coupled to the attachment post of the primary member.

3. The turbine blade assembly of claim 1, wherein the retainer blocks are shaped to provide a root of the turbine blade assembly configured to engage with a slot formed in a corresponding turbine disk.

4. The turbine blade assembly of claim 1, wherein the retainer blocks are formed to include recesses, each of the recesses positioned to receive a portion of the attachment post of the primary member.

5. The turbine blade assembly of claim 4, wherein the retainer blocks are fixed to one another and the recesses formed in the retainer blocks are shaped so as to block removal of the attachment post from the root provided by the retainer blocks.

6. The turbine blade assembly of claim 5, wherein the retainer blocks are fixed to one another by a diffusion braze or diffusion bond.

7. The turbine blade assembly of claim 1, wherein the clip is a bi-cast component that interfaces with the attachment post of the primary member included in the turbine blade assembly.

8. The turbine blade assembly of claim 7, wherein the attachment post of the primary member is shaped to provide a root of the turbine blade assembly configured to engage with a slot formed in a corresponding turbine disk.

9. The turbine blade assembly of claim 1, wherein the clip is a bi-cast component and interfaces with the airfoil of the primary member included in the turbine blade assembly.

10. A turbine blade assembly configured to be rotated about an axis to withdraw mechanical energy from gasses interacting with the turbine blade assembly, the turbine blade assembly comprising a primary member comprising ceramic matrix composite materials, the primary member shaped to form an airfoil and an attachment post, an independent platform formed to include an aperture that receives the attachment post and engages a radially-inwardly facing surface of the airfoil to block radially-outward motion of the independent platform relative to the primary member, and retainer blocks that engage a radially inner-most surface of the independent platform to block radially-inward motion of the independent platform relative to the primary member so that the independent platform is retained in place relative to the primary member, wherein the retainer blocks are coupled to the attachment post of the primary member.

11. The turbine blade assembly of claim 10, wherein the independent platform is coupled to the attachment post by a clip that interfaces between the independent platform and the attachment post of the primary member to fix the independent platform in place relative to the primary member of the turbine blade assembly.

12. The turbine blade assembly of claim 10, wherein the retainer blocks are shaped to provide a root of the turbine blade assembly configured to engage with a slot formed in a corresponding turbine disk.

13. The turbine blade assembly of claim 12, wherein the retainer blocks are formed to include recesses, each of the recesses positioned to receive a portion of the attachment post of the primary member.

14. The turbine blade assembly of claim 13, wherein the retainer blocks are fixed to one another and the recesses formed in the retainer blocks are shaped so as to block removal of the attachment post from the root provided by the retainer blocks.

15. The turbine blade assembly of claim 14, wherein the retainer blocks are fixed to one another by a diffusion braze or diffusion bond.

16. The turbine blade assembly of claim 10, wherein the retainer blocks extend around only a portion of the attachment post adjacent to the independent platform to form a keeper collar and the attachment post is shaped to provide a root of the turbine blade assembly configured to engage with a slot formed in a corresponding turbine disk.

17. The turbine blade assembly of claim 16, wherein the attachment post has a dovetail shape configured to engage with a dovetail slot formed in a corresponding turbine disk.

18. The turbine blade assembly of claim 16, wherein the retainer blocks of the keeper collar are fixed to the attachment post by at least one bi-cast clip.

19. A turbine blade assembly configured to be rotated about an axis to withdraw mechanical energy from gasses interacting with the turbine blade assembly, the turbine blade assembly comprising a primary member comprising ceramic matrix composite materials, the primary member shaped to form an airfoil and an attachment post, an independent platform formed to include an aperture that receives the attachment post and engages a substantially radially-inwardly facing surface of the airfoil to block radially-outward motion of the independent platform relative to the primary member, a braze layer that interfaces with the primary member and the independent platform to fix the independent platform to the primary member and block radially-inward motion of the independent platform relative to the primary member, and retainer blocks that engage a radially inner-most surface of the independent platform to block radially-inward motion of the independent platform relative to the primary member.

* * * * *